March 26, 1940. W. T. CRODEN Re. 21,407

CONTROL SYSTEM

Original Filed Dec. 21, 1934

INVENTOR.
WILLIAM T. CRODEN
BY Harold W. Mattingly
ATTORNEY.

Reissued Mar. 26, 1940

Re. 21,407

UNITED STATES PATENT OFFICE 21,407

CONTROL SYSTEM

William T. Croden, Rice, Calif.

Original No. 2,086,120, dated July 6, 1937, Serial No. 758,628, December 21, 1934. Application for reissue May 6, 1939, Serial No. 272,279

8 Claims. (Cl. 171—274)

My invention relates to alternating current control systems, either single or polyphase and has particular reference to a system for controlling the voltage applied to alternating current motors having series characteristics in such manner that the speed of such motors is maintained constant, irrespective of load.

In certain machine tool applications it has been found desirable and oftentimes necessary to supply electric motors for their operation having extremely high starting torque and high torque sensitivity. In these cases it is common practice to employ series type direct current motors, but the use of such motors is accompanied by numerous disadvantages.

The use of direct current series motors necessarily requires a source of direct current for operation. This is oftentimes difficult or expensive to obtain, since it is common practice to supply industrial and manufacturing establishments with alternating current type of power. Furthermore, the direct current series motor, while supplying demands as regards torque characteristics, has a badly drooping inherent speed regulation curve resulting in wide fluctuations in motor speed with moderate changes in load upon the motor.

As is well known constancy of speed is also a desirable and oftentimes essential requirement in the operation of machine tools, and for this reason direct current series motors are, to some extent, unsatisfactory for this application. This difficulty has been overcome in some applications by employing constant speed motors of the induction or squirrel-cage type which have been specially wound to provide the desirable torque characteristics. Such motors are, however, very inefficient and require the use of a mechanical transmission or gear change box in order to provide the necessary speed selection to permit different machining operations to be performed with the machine tool with which such motor is used.

It is therefore an object of my invention to provide a control system which when combined with a series type alternating current motor will provide the typical series type torque characteristics and operate to maintain the speed of such motor constant irrespective of load variations.

It is a further object of my invention to provide a control system of the character set forth in the preceding paragraph in which a saturable core reactor is employed to cause the voltage applied to the motor with which the system is associated to be varied in accordance with the speed-load-voltage characteristic of such motor.

It is also an object of my invention to provide a control system of the character set forth in the preceding paragraphs in which a current transformer and rectifier associated therewith are employed to excite the direct current control winding employed for saturating the saturable core reactor.

It is also an object of my invention to provide a special current transformer for use in a control system of the character set forth in the preceding paragraphs which includes means for producing a non-linear relationship between the changes in current flowing through the primary of said current transformer and the voltage induced in the transformer secondary.

It is also an object of my invention to provide a system of the character set forth in the preceding paragraphs in which grid-glow rectifiers are employed in combination with a phase shifting device to provide the desired regulation of voltage in accordance with the speed load voltage characteristic of the motor with which the system is employed.

It is a further object of my invention to provide a control system of the character set forth in the preceding paragraphs in which is employed an adjustable means for establishing the speed of the motor which will be maintained by the regulating equipment.

Other objects and advantages of my invention will be apparent from a study of the following specifications, read in connection with the accompanying drawing, wherein.

Figure 2:
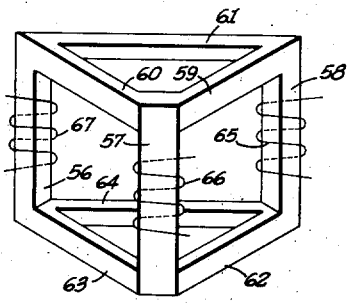
Fig. 2 is a schematic representation of a saturable core reactor which is particularly applicable to use in the systems illustrated in Fig. 1.
Figure 1:
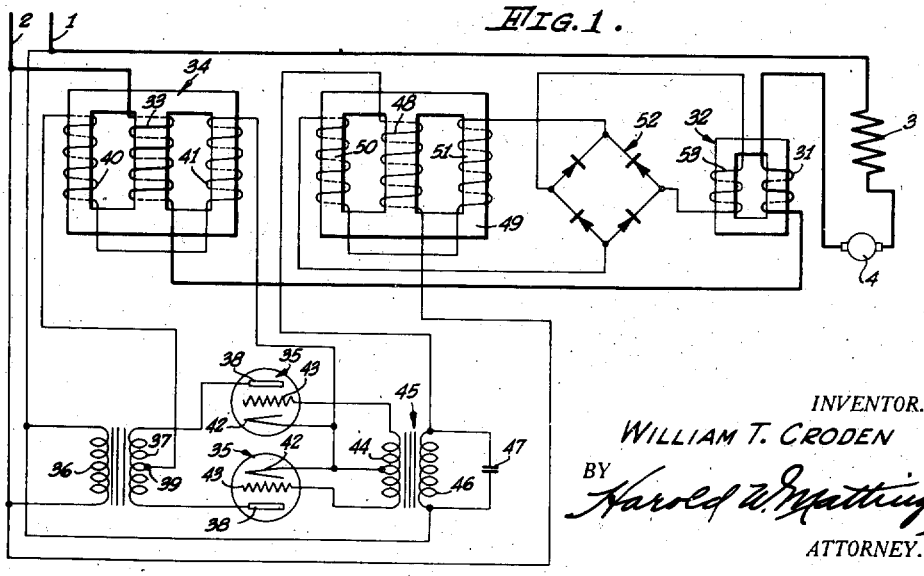
Fig. 1 is a schematic representation of the system of my invention as applied to a single phase circuit including an alternating current series motor.

Referring to the drawing, I have illustrated diagrammatically a regular alternating current service or source of power comprising line conductors 1 and 2, it being understood that a local generator is a complete equivalent. Tracing these leads, the line 1 connects first through a field 3 and armature 4 of an alternating current series motor which represents the load or point of utilization.

A primary winding 31 of a current transformer 32, and a series winding 33 of a saturable core reactor 34 are also connected in series with the motor 3—4 across the supply lines 1—2. Direct current components of magnetic flux in the reactor core are supplied through a pair of rectifier tubes 35 of the so-called "grid-glow" or "Thyraton" type. These tubes are supplied by a transformer whose primary 36 is bridged across the lines 1 and 2, and whose secondary 37 is connected between anodes 38 of the two rectifiers 35. A center tap 39 of the secondary winding 37 connects through a pair of series connected direct current control windings 40 and 41 of the saturable reactor 34 and thence back to cathodes 42 of the rectifier tubes 35. Grids 43 of these tubes connect to opposite ends of a primary winding 44 of a transformer 45, a center tap of which winding also connects with the cathodes 42.

A secondary winding 46 of the transformer 45 is bridged by a condenser 47, and is connected between the line 1 and a series winding 48 of a second saturable reactor 49, and thence back to the other conductor 2.

Saturating windings 50 and 51 of the reactor 49 are connected in series to be supplied by a bridge-type rectifier 52 from a secondary 53 of the current transformer 32.

In this arrangement the current supplied by the current transformer 32 may be extremely small, since its function is merely to change the phase of the voltage supplied to the grids 43 of the grid-glow rectifiers. The actual power drawn by these grids will be small, for the grids merely serve to determine at what portion of the cycle the tubes 35 shall start to draw current. The control of rectifiers of the grid-glow type by change of phase of the grid voltage is sufficiently well known so that it is unnecessary to describe it here, it being obvious that the division of voltage between the transformer primary 46 and the reactor coil 48 will change in both phase and magnitude as the saturation of the reactor core 49 changes, and that through this means very large changes in the saturation of the reactor core 34 may be accomplished with relatively small changes in the power supplied by the current transformer 32. The voltage supplied across the motor may therefore be caused to vary very rapidly with slight changes in load, thereby providing extremely accurate and extremely rapid control of the speed of the motor 3—4.

The operation of the device will be understood by considering the motor as operating with a minimum load. Under these conditions the voltage supplied by the source 1—2 will be divided between the motor 3—4 and the reactor series windings 33. Normal current through the primary winding 31 of the current transformer 32 will cause a small voltage to be induced in the secondary winding 53. Current flowing as a result of this small voltage will be rectified and induce a negligible D.-C. component in the control windings 50—51. This results in the voltage which is applied to the grids of the grid-glow tubes being substantially out of phase with the voltage applied to the anodes of these tubes so that a negligible direct current is caused to flow in the control windings 40—41.

An increase in the load upon the series motor 3—4, however, will cause larger currents to flow. This would normally cause an increased voltage drop in the windings 33, but the increased current will cause a larger current to flow in the rectifier circuit and the control windings 50—51, thus saturating the saturable reactor 49 and thereby greatly decreasing the reactance of the windings 48. This causes the grid and anode voltages to become more nearly in phase with each other so that an increased direct current is caused to flow in the control windings 40—41. The voltage across the reactor windings 33 is therefore decreased instead of increased by the increased flow of current.

Attention is called to the fact that alternating current series motors have a "series characteristic" which requires an increase in terminal voltage to provide an increased power output when operated at a constant speed, and also that constant speed with changes in load cannot be accurately maintained with the regulator just described if the amount of direct current flowing in the direct current windings 40—41 is made exactly proportional to the amount of current flowing through the primary of the current transformer 32. This is due, in part, to the particular characteristics of the series motor employed and due also, in part, to the relative proportions of the iron circuit employed in the saturable reactor 34 and its relation to the windings placed thereon. For this reason the physical constants of the current transformer 32, saturable reactor 49, and capacitor 47 are accordingly adjusted with respect to the saturable reactor 34, the characteristics of the tubes 35, and the particular series motor 3—4 with which the regulating equipment is to be used so as to provide the desired non-linearity of response. I have found that proper adjustment of these factors permits me to achieve substantially constant speed regulation of an alternating current series motor, irrespective of load imposed on said motor.

It is to be understood that the drawing shows but one of a large number of modifications of my invention using rectifier tubes of the grid-glow type, since there are many circuits using these tubes in either full wave or half wave relationship which are well known in the art.

It should also be noted that while the principal object of my invention is to provide an alternating current series motor and control equipment operating in combination therewith to maintain a substantially constant rotational speed of the motor irrespective of load variations thereon, it should be noted that a suitable change in circuit constants will provide either a drooping or a rising speed characteristic to meet certain special commercial applications of my invention.

It will be obvious that many modifications are possible in the core structure of the various reactors and transformers using my system. Certain of the various windings may safely be placed on different legs of the same core structure, in order to save the total amount of material used, but in attempting this due care should be exercised that unexpected voltages be not developed across the other windings. It is especially desirable that care should be given to the design of the saturated reactor since it is possible to develop fairly high voltages in the various portions of the D.-C. windings even though the voltage across the terminals may be zero.

One desirable form of core for such reactors is illustrated schematically in Fig. 3. This core construction preferably includes three core legs 56, 57 and 58 mutually interconnected each with the other by means of a triangular upper end yoke comprising portions 59, 60 and 61 and a similar lower yoke comprising members 62, 63 and 64.

In order to achieve the desired balancing of fluxes so as to prevent the generation of unexpected or undesired voltages in a direct current control winding, it is essential that this magnetic structure be truly symmetrical. In this case series A.-C. windings 65 and 66 are connected, either in series or in parallel, so as to excite a magnetic circuit comprising the legs 57, 58 and the end yoke members 59 and 62 of the core. Under these circumstances the magnetomotive force that is developed across the leg 56 is extremely small, since if the device be truly symmetrical the magnetomotive forces across its ends are such as to balance out. It is upon this leg 56 that a saturating or D.-C. control winding 67 is disposed, the magnetic circuit of this winding necessarily including the two legs 57 and 58, which are accordingly changed in saturation by the current through this coil.

It will therefore be observed that I have provided an alternating current control system which, when combined with an alternating current series type of motor and adjusted in accordance with the characteristics thereof, will operate to maintain a substantially constant rotational speed of said motor, irrespective of load variations thereon.

It will also be noted that the system of my invention is adapted to use with relatively large motors of this type and that with such a system the amount of power required by the controlling mechanism is relatively small so that even when combined with series type alternating current motors of relatively large horsepower, the efficiency of the system is not seriously impaired.

While I have shown and described the preferred embodiment of my invention, I do not desire to be limited to any of the details of construction shown or described herein, except as defined in the appended claims.

I claim:

1. In an alternating current system comprising a source of power and a load, means for regulating the power supplied to said load comprising a current transformer and a saturable reactor in series with said load, a rectifier system including rectifier tubes of the grid-glow type connected to supply a direct current component to said saturable reactor, a circuit including a second saturable reactor connected to supply a control voltage to said grid-glow tubes, and a rectifier supplied by said current transformer and connected to supply a direct current component to said second reactor.

2. In an alternating current system comprising a source of power and a load, a saturable reactor and a current transformer connected in series with said load, means connected across said source for supply a saturating current for said reactor, a rectifier system supplied by said current transformer, and means controlled by the output of said current transformer and including a second saturable reactor for controlling the saturating current supplied to said first mentioned saturable reactor.

3. In an alternating current system comprising a source of current and a load, means for regulating the power supplied to said load from said source comprising an impedance and a current transformer in series with said load, a rectifier system connected to the output of said current transformer, a saturable reactor connected to derive its saturating current from said rectifier system, means including a tube of the grid-glow type for controlling said impedance, and a control circuit for said grid-glow tube including said saturable reactor.

4. In combination with an alternating current motor having series characteristics, means for increasing with increasing loads the voltage supplied to said motor from a substantially constant source, comprising a saturable reactor and a current transformer connected in series with said source and motor, a rectifier system connected to supply saturating current to said saturable reactor, and means controlled by current from said transformer and comprising a second rectifier and saturable reactor for controlling the current supplied by said rectifier system.

5. In combination with an alternating current motor having series characteristics, means for increasing with increasing load the voltage supplied to said motor from a substantially constant potential source comprising a saturable reactor and a current transformer connected in series with said source and motor, a grid glow tube rectifier system connected to supply saturating current to said saturable reactor, and means controlled by current from said transformer and comprising a second rectifier and saturable reactor for controlling the current supplied by said rectifier system.

6. In an electric circuit, the combination of: a source of alternating current; an electric motor having a series characteristic connected to said source of alternating current; and a regulator interposed between said source of current and said motor comprising a saturable reactor having an impedance winding connected in circuit with said motor and a direct current control winding, means for supplying direct current to said control winding, and means responsive to changes in load current of said motor for simultaneously correspondingly varying the magnitude of said direct current to maintain the speed of said motor constant by varying the terminal voltage thereof in accordance with said series characteristic.

7. In an electric circuit, the combination of: a source of alternating electric current; an electric motor having a series characteristic connected to said source of alternating current; and a regulator interposed between said source of current and said motor comprising a current responsive means connected in series with said motor, a saturable reactor having an impedance winding connected in circuit with said motor and a direct current control winding, control means connected between said current responsive means and said control winding for supplying direct current to said control winding to vary the impedance of said impedance winding oppositely relative to changes in current flowing through said current responsive means, and means associated with said current responsive means for controlling the amount of direct current in said control winding to vary the terminal voltage of said motor nonlinearly relative to the current flowing in said current responsive merans in accordance with said series characteristic to maintain said motor speed at a substantially constant value independently of variations in load on said motor.

8. In an electric circuit, the combination of: a source of alternating current; an electric motor having a series characteristic connected to said source of alternating current; and a regulator interposed between said source of current and said motor comprising a saturable reactor having an impedance winding connected in circuit with said motor and a direct current control winding, a current transformer having a primary winding connected in series with said motor, a secondary winding on said current transformer, circuit means including a rectifier connecting said secondary winding to supply direct current to said control winding to vary the impedance of said impedance winding oppositely relative to changes in current flowing through said current transformer primary winding, and means associated with said secondary winding for controlling the amount of direct current in said control winding to vary the terminal voltage of said motor nonlinearly relative to the current flowing in said current transformer primary winding in accordance with said series characteristic to maintain said motor speed at a substantially constant value independently of variations in load on said motor.

WILLIAM T. CRODEN.